United States Patent [19]

Null et al.

[11] 4,180,553

[45] Dec. 25, 1979

[54] PROCESS FOR HYDROGEN RECOVERY FROM AMMONIA PURGE GASES

[75] Inventors: Harold R. Null, Creve Coeur; Eli Perry, Olivette, both of Mo.

[73] Assignee: Monsanto Company, St. Louis, Mo.

[21] Appl. No.: 888,256

[22] Filed: Mar. 20, 1978

[51] Int. Cl.$^2$ ............................................. C01C 1/04
[52] U.S. Cl. ...................................... 423/359; 55/16
[58] Field of Search ............... 423/359, 360, 361, 362, 423/363; 55/16, 158

[56] References Cited

U.S. PATENT DOCUMENTS

| 3,675,434 | 7/1972 | Crawford et al. | 62/23 |
| 4,058,589 | 11/1977 | Haslam | 423/359 |

FOREIGN PATENT DOCUMENTS 105429 4/1974 Fed. Rep. of Germany ........... 423/359

OTHER PUBLICATIONS

Baichtok et al., Membran Tekhnol–Novoe Napravlenie Nauke Tekh, 1973.
Gardner et al., Hollow Fiber Permeator for Separating Gases, Chem. Eng. Prog., 10/77, pp. 76–78.
Brubaker et al., Separation of Gases by Plastic Membranes, I & EC, vol. 46, No. 4, pp. 731–739, 1954.

*Primary Examiner*—O. R. Vertiz
*Assistant Examiner*—Thomas W. Roy
*Attorney, Agent, or Firm*—Norman L. Balmer; Howard C. Stanley; James W. Williams, Jr.

[57] ABSTRACT

Ammonia synthesis processes are disclosed which provide enhanced conversion of hydrogen values to ammonia. In the processes, a purge stream from an ammonia synthesis loop, which purge stream contains ammonia, is contacted at a superatmospheric pressure with the feed side of a separation membrane which exhibits selective permeation of each of hydrogen and ammonia as compared to the permeation of each of methane and argon. A total pressure differential across the membrane is maintained to provide a driving force for the permeation of hydrogen and ammonia through the membrane. A hydrogen-rich permeating gas which contains ammonia is obtained on the permeate exit side of the membrane. The permeating gas is combined with the gas in the ammonia synthesis loop and passed to the ammonia synthesis reaction zone for conversion to ammonia. Ammonia which permeates the membrane can be recovered by the means to remove product ammonia from the gas in the synthesis loop. A non-permeating gas is removed from the feed side of the separation membrane at substantially the same pressure at which the purge stream is contacted with the separation membrane.

12 Claims, 4 Drawing Figures

PROCESS FOR HYDROGEN RECOVERY FROM AMMONIA PURGE GASES

This invention relates to processes for synthesizing ammonia from nitrogen and hydrogen, and particularly to ammonia synthesis processes in which hydrogen is recovered from an ammonia synthesis loop purge stream and recycled for use in the ammonia synthesis reaction.

By this invention, there are provided processes for the synthesis of ammonia from nitrogen and hydrogen which processes are characterized by enhanced conversion of hydrogen to ammonia. In accordance with the processes of this invention, the enhanced hydrogen conversion can be achieved even when process equipment design limitations do not permit an increase in the amount of ammonia produced; however, often increased ammonia production can be obtained. The enhanced conversion of hydrogen which can be achieved by the processes of this invention involve little additional energy consumption over similar ammonia processes which do not have the enhanced hydrogen conversion, and often the energy consumption per unit of ammonia product produced is decreased. Desirably, an increased proportion of the ammonia produced by the ammonia synthesis is recovered from the gas in the ammonia synthesis loop, thereby reducing the amount of ammonia in the purge stream from an ammonia synthesis process. Additionally, purge gases from the processes of this invention are at high pressure and provide a valuable source of energy. Moreover, the enhanced hydrogen conversion provided by the ammonia synthesis processes of this invention can be achieved without undue deleterious effects on the ammonia synthesis process equipment. Furthermore, existing ammonia synthesis plants can facilely be modified to provide ammonia synthesis processes in accordance with this invention. Advantageously, if desired, the enhanced conversion of hydrogen to ammonia in these modified prior ammonia synthesis processes can be achieved with the use of conventional operating conditions of the ammonia synthesis reaction zone. Thus, operational changes due to the modification, if required at all, may be minor.

Ammonia is synthesized from the catalytic reaction of hydrogen and nitrogen. The hydrogen feedstock for the ammonia synthesis is generally obtained from primary reforming of hydrocarbon, e.g., natural gas. The effluent from the primary reforming thus contains impurities such as methane, carbon oxides, i.e., carbon dioxide and carbon monoxide, water and the like. Current practice provides for the removal of impurities from the reformer effluent which may be harmful to the ammonia synthesis catalyst such as the carbon oxides, sulfur compounds and the like; however, impurities such as methane are generally not completely removed from the reformer effluent since they are not directly harmful to the ammonia synthesis reaction and are expensive to remove. The nitrogen feedstock is usually obtained from air with the removal of oxygen, e.g., by combustion with fuel to produce water or carbon dioxide and water, followed by removal of the water and carbon dioxide, if present, or by liquifaction. The resultant nitrogen stream contains minor amounts of impurities such as argon which are present in small amounts in air. Since these impurities are not directly harmful to the ammonia synthesis reaction, they are not generally removed from the nitrogen feedstock due to economic considerations.

The hydrogen feedstock and nitrogen feedstock are combined in essentially stoichiometric amounts to provide a synthesis feed gas for producing ammonia, and the synthesis feed gas is compressed to ammonia synthesis pressures, e.g., superatmospheric pressures of often at least about 100 atmospheres absolute. The compressed synthesis feed gas is contacted with an ammonia synthesis catalyst such as a promoted iron catalyst in an ammonia synthesis reaction zone. The ammonia synthesis reaction is an equilibrium reaction and is exothermic. Frequently temperatures greater than about 400° C. may be produced. Generally, the conversion to ammonia based on hydrogen fed to the synthesis reaction zone is less than about 30 percent, and is frequently less than 20 percent. Thus the reaction effluent from the ammonia synthesis reaction zone contains substantial amounts of hydrogen and nitrogen. Accordingly, ammonia is condensed from the reaction effluent and the reaction effluent containing the valuable hydrogen is recycled in an ammonia synthesis loop to the ammonia synthesis reaction zone in order to provide an attractive conversion of hydrogen in the feed to ammonia. Difficulties occur in that the impurities such as methane, argon, etc., in the hydrogen and nitrogen feedstocks do not take part in the ammonia synthesis reaction and must be removed from the ammonia synthesis loop in an amount sufficient to prevent an undue build-up of these inert components in the ammonia synthesis loop. Conveniently, the removal of these inert components is effected by removing a purge stream from the ammonia synthesis loop. The purge stream will contain the same concentration of hydrogen and nitrogen as the gas in the ammonia synthesis loop. Hence, recovery of the valuable hydrogen from the purge stream for return to the ammonia synthesis reaction zone may be highly desirable. The purge stream also contains ammonia which is advantageously recovered as ammonia product. Desirably, ammonia is recovered from the purge stream and combined with the ammonia product recovered from the gas in the ammonia synthesis loop.

Ammonia synthesis processes which are of commercial interest are complex and integrated with the steps in the processes being highly interacting to maximize ammonia production on an economically attractive basis. Thus changes in one step of the process may affect other steps in the process as well as the overall economics, including capital expenditures and operating expenditures, of an ammonia synthesis plant. Therefore, the adoption of a procedure for recovering and recycling hydrogen from the purge stream to the ammonia synthesis reaction zone may be detrimental to the overall economics or the interaction of the process steps of the ammonia synthesis even though hydrogen is recovered and recycled.

Proposals for recovery of hydrogen from ammonia synthesis purge streams have included proposals for cryogenic recovery systems. More recent proposals for cryogenic hydrogen recovery systems for treating purge streams have emphasized reducing operating costs especially with respect to energy consumption in cooling and the selective removal of helium from hydrogen using cryogenic processes. For instance, Haslam in United States patent number 4,058,589, issued Nov. 15, 1977, (see also Haslam, et al, "Recycle $H_2$ in $NH_3$ Purge Gas", *Hydrocarbon Processing*, January 1976, pp. 103-106) discloses a process for the treatment of ammonia synthesis purge containing helium. In the disclosed process, the purge stream in cooled to about 85° K. at 735 psig (about 51 atmospheres absolute) to condense methane, nitrogen, argon, and some helium, and provide a hydrogen-rich gas stream. The hydrogen-rich stream is used in heat exchange to the purge stream to be treated while being maintained at 735 psig. The hydrogen-rich stream is then recycled and combined with the fresh hydrogen and nitrogen feedstock to the ammonia synthesis reaction zone. Crawford, et al, in U.S. Pat. No. 3,675,434, issued July 11, 1972, disclose another cryogenic process for treating ammonia synthesis purge to recover a hydrogen-rich gas. In the process disclosed by Crawford, et al, the purge gas is cooled to provide a condensate and a higher pressure hydrogen-rich gas. The condensate is flashed to produce a lower pressure hydrogen-rich gas and a condensate containing nitrogen, methane and argon. Both of the higher and lower pressure hydrogen-rich gases are used in heat exchange to reduce temperatures of the purge stream. The higher pressure hydrogen-rich gas is returned to the ammonia synthesis reaction zone by means of a compressor in the ammonia synthesis loop, and the lower pressure hydrogen-rich gas is returned to the feed compressor to be compressed with the hydrogen and nitrogen feedstocks. Generally, the purge stream from cryogenic hydrogen recovery systems is low pressure and hence its energy content has been significantly depleted. In view of the nature of cryogenic processes, for all practical purposes, all of the ammonia in the purge stream is condensed and provisions must be made for the removal and recovery of this condensed ammonia from these cryogenic processes. Although cryogenic recovery of hydrogen from ammonia synthesis purge streams has long been suggested, its adoption has been limited due to the high capital costs of cryogenic recovery systems and limited savings which could be appreciated in using the systems.

Increasing costs and shortages of natural resources required for ammonia synthesis such as natural gas are leading to greater interest developing in alternative methods for recovering valuable hydrogen from ammonia synthesis purge gases, which alternative methods do not require unduly high capital costs or operating expenses.

One method which has achieved limited interest is the use of separation membranes which exhibit selective permeation. One group of proposals for the use of separation membranes for treating a purge stream from an ammonia synthesis process has included the use of metal membranes, e.g., palladium and palladium alloy membranes, through which essentially only hydrogen permeates. Consequently, a highly pure hydrogen permeate is obtained. However, other means need be provided to remove ammonia from the purge stream otherwise valuable ammonia product will be exhausted from the ammonia synthesis system.

Gardner, et al in "Hollow Fiber Permeator for Separating Gases", *Chemical Engineering Progress*, October 1977, pages 76 to 78, suggest that one application for separation membranes is in treating an ammonia synthesis purge stream to recover hydrogen. This article reports the substance of a paper presented at the meeting of the American Institute of Chemical Engineers on about Mar. 21, 1977. The authors suggest several benefits which might be achieved through hydrogen recovery using separation membranes; however, the simplified flow diagrams and descriptions which are presented essentially provide only that membranes might be useful in an ammonia synthesis system without any of the specifics which are necessary in order to provide an operable, efficient ammonia synthesis system. Specifically, Gardner, et al, disclose an ammonia synthesis system in which the purge stream is reduced in total pressure from about 1900 pounds per square inch gauge (psig) (about 130 atmospheres absolute) to about 1000 psig (about 69 atmospheres absolute) and passed through the bores of 7 hollow fiber-containing permeators. A further 100 psi (6.8 atmospheres) pressure loss in the purge stream is incurred by passage through the bores of the hollow fibers. The composition of the hollow fibers proposed for use in treating the ammonia purge stream is not disclosed. Even assuming that ammonia could permeate the hollow fibers, Gardner, et al, are wholly silent on whether or not the purge stream contacting the hollow fibers contains ammonia. A hydrogen-rich permeate is obtained from the shell side of the permeators at a pressure of 400 psig (about 28 atmospheres absolute), and the permeate is combined with the feed at 400 psig (about 28 atmospheres absolute) and recompressed to the ammonia synthesis pressure. Accordingly, even though only a 34 to 40 atmosphere pressure differential occurs across the membrane, the expense of recompressing the permeate to over 130 atmospheres absolute must be borne.

Many factors are involved in providing an operable, efficient ammonia synthesis process in which separation membranes are employed to recover hydrogen from the purge stream, for instance, the nature and relative concentrations of the components in the purge stream contacting the membrane, the pressure drop of the permeating and non-permeating gases from the membrane, the conditions of the process stream in which the recovered hydrogen is reintroduced into the ammonia synthesis system, the nature of the gases with which the hydrogen-rich gases are combined and the like.

In view of the many factors involved in providing an operable, efficient ammonia synthesis process in which hydrogen is recovered from the purge stream by separation membranes and the highly integrated nature of ammonia synthesis processes, it is not surprising that there has been little, if any, interest in the use of membranes to recover hydrogen from purge streams. Since the cryogenic hydrogen recovery systems separate gases by a different mechanism than that of separation membranes, it is not unexpected that substantial differences exist in the nature of the hydrogen-rich gas obtained by each method. These differences may be not only in components and compositions but also in pressures, temperatures and the like. Accordingly, it is easily understood that technology pertaining to cryogenic recovery of hydrogen in ammonia purge streams may not be applicable to the use of separation membranes for recovery of hydrogen from ammonia purge streams.

In accordance with the processes of this invention for synthesizing ammonia, a nitrogen and hydrogen-containing reactor feed gas is introduced to and reacted in an ammonia synthesis reaction zone at superatmospheric synthesis pressures to produce ammonia. An ammonia-containing gas, i.e., the reaction effluent, is withdrawn from the ammonia synthesis reaction zone. The reaction effluent contains substantial amounts of unreacted nitrogen and hydrogen and is recycled in an ammonia synthesis loop to the ammonia synthesis reaction zone. A synthesis feed gas comprising nitrogen, hydrogen and contaminants including at least one of methane and argon is compressed to the superatmospheric synthesis pressure and is combined with the recycling reaction effluent in the ammonia synthesis loop. Ammonia product is removed from the reaction effluent in the ammonia synthesis loop. Also, a purge stream is removed from the reaction effluent in the synthesis loop in an amount sufficient to maintain the volume percent of inert contaminants, e.g., methane and argon, in the reactor feed gas suitably low. The purge stream is at substantially the superatmospheric synthesis pressure.

In the processes of this invention, a purge stream from the ammonia synthesis loop which purge stream contains ammonia is contacted at a superatmospheric pressure, preferably, a pressure of at least substantially the superatmospheric synthesis pressure, with a separation membrane, which membrane exhibits selectivity to the permeation of each of hydrogen and ammonia as compared to the permeation of each of methane and argon. A total pressure differential across the membrane is maintained to provide the driving force to effect hydrogen and ammonia permeation through the membrane. Suitable hydrogen and ammonia fluxes through the membrane can be provided such that at least about 20 percent of the hydrogen in the purge stream permeates through the membrane. Preferably, at least about 20 percent of the ammonia in the purge stream permeates through the membrane.

Further advantages occur in the preferred aspect of the processes of this invention wherein the purge stream is contacted with the separation membrane at a pressure of at least substantially the superatmospheric synthesis pressure. For instance, high total pressure differentials across the membrane are enabled since the purge stream is contacted with the membrane at such a high pressure. The high pressure differentials across the membrane which can be achieved in accordance with the processes of this invention can provide advantageous driving forces for hydrogen and ammonia permeation through the membrane without requiring undue recompression of the permeating gas for reintroduction into the ammonia synthesis reaction zone. Undue recompression of the permeating gas can significantly offset the savings which are obtained by recovering the hydrogen in the purge stream.

The permeating gas is recovered from the exit side of the membrane and is recycled to the ammonia synthesis reaction zone. The permeating gas can be recompressed to substantially the superatmospheric synthesis pressure and introduced into the ammonia synthesis loop. The ammonia which permeates the membrane in accordance with the processes of this invention can be recovered with the ammonia removed from the gases in the synthesis loop. The non-permeating gas which contains a reduced weight amount of ammonia is removed from the feed side of the separation membrane. The non-permeating gas is at substantially the same pressure at which the purge stream is contacted with the separation membrane and thus may often provide a valuable energy source due to its high pressure and combustible gas content.

In further detail, the predominant components of the synthesis feed gas are hydrogen and nitrogen. The synthesis feed gas contains at least one of methane and argon as inert contaminants. Methane may be present in the synthesis feed gas in amounts of up to about 5, e.g., about 0.1 to 3, volume percent, and argon, up to about 0.5, e.g., about 0.1 to 0.5, most often about 0.3, volume percent. Other contaminants which may be present include water and helium. The ratio of hydrogen to nitrogen which is present in the feed gas is preferably such that the mole ratio of hydrogen to nitrogen of the reactor feed gas introduced into the ammonia synthesis reaction zone is substantially constant to prevent a build-up of either hydrogen or nitrogen in the ammonia synthesis loop. However, the mole ratio of hydrogen to nitrogen in the reactor feed gas may be greater or less than the stoichiometric ratio such that the excess of hydrogen or nitrogen over that required for the reaction to ammonia on a stoichiometric basis shifts the equilibrium in favor of ammonia production. In such situations, the mole ratio of hydrogen to nitrogen may be from about 2 or 2.5:1 to about 3.5 or 4:1. Higher or lower mole ratios could be employed; however, since a purge stream must be removed from the synthesis loop to prevent undue build-up of contaminants, considerable increases in the amount of nitrogen or hydrogen in the purge stream would occur. Since the processes of this invention minimize the lose of hydrogen in the purge stream, ammonia synthesis processes in which the reactor gas has a greater than 3:1 mole ratio of hydrogen to nitrogen may become attractive. Generally, the mole ratio of hydrogen to nitrogen in the reactor feed gas is about 2.8:1 to 3.5:1, say, about 2.9:1 to 3.3:1. Frequently, the mole ratio of hydrogen to nitrogen in the reactor feed gas is substantially that mole ratio required for the reaction of hydrogen and nitrogen on a stoichiometric basis, e.g., about 2.95:1 to 3.05:1. Generally, nitrogen does not permeate the membrane to a significant extent, and the permeating gas contains little, if any, nitrogen. However, any nitrogen which is recovered by and recycled from the separation membrane represents a savings with respect to the nitrogen feedstock demands. The mole ratio of hydrogen to nitrogen in the synthesis feed gas generally is slightly less than the mole ratio of hydrogen to nitrogen in the reactor feed gas since additional hydrogen is provided by the permeating gas from the separation membrane. In typical ammonia plants in accordance with this invention, the mole ratio of hydrogen to nitrogen in the synthesis feed gas may be about 2.7:1 to 3.2:1, say, about 2.8:1 to 3.0:1. Frequently, the reactor feed gas contains about 0.5 to 5, say, about 1 to 4, volume percent ammonia, and less than about 25 volume percent inert contaminants, say, about 4 to 15 volume percent inert contaminants. Thus, the reactor feed gas may comprise about 2 to 15 volume percent methane, about 2 to 10 volume percent argon, and about 0.1 to 5 volume percent helium, if present in the reformer feed.

The reaction between hydrogen and nitrogen to produce ammonia is exothermic and is an equilibrium reaction. The ammonia synthesis may be conducted using any suitable procedure such as the Haber-Bosch, modified Haber-Bosch, Fauser and Mont Cenis systems. See, the *Encyclopedia of Chemical Technology*, Second Edition, Volume 2, pages 258, et seq., herein incorporated by reference, for various of the processes for synthesizing ammonia from hydrogen and nitrogen. In general, these processes employ superatmospheric ammonia synthesis pressures of at least about 100 atmospheres absolute and promoted iron synthesis catalysts. The ammonia synthesis reaction zone is generally cooled to maintain reaction temperatures of about 150° or 200° to 600° C. the use of high synthesis pressures shifts the equilibrium in favor of the formation of ammonia. Although some ammonia synthesis pressures which have been employed are as high as 500 or more atmospheres absolute, most present day ammonia plants utilize synthesis pressures of about 100 to 300 or 350 atmospheres absolute, especially about 125 to 275 atmospheres absolute. Typically, the ammonia synthesis feed gas is compressed in at least two stages in order to facilitate achieving synthesis pressures. Generally, the pressure of the synthesis feed gas prior to at least one compression stage is within at least about 100, say, about 20 to 100, atmospheres below the synthesis pressure. The lowest pressure in the ammonia synthesis loop is preferably within about 5 or 10 atmospheres below the synthesis pressure. A recycle compressor is generally employed to circulate the gases in the synthesis loop and to maintain the desired synthesis pressure in the ammonia synthesis reaction zone.

The conversion to ammonia based on hydrogen entering the ammonia synthesis reaction zone is often about 5 to 30, e.g., about 8 to 20 percent. In many commercial plants, the ammonia concentration of the reaction effluent exiting the ammonia synthesis reaction zone is about 10 to 15 or 25 volume percent.

Ammonia in the reaction effluent from the ammonia synthesis reaction zone is removed from the synthesis loop. A preferred method for removing the ammonia is by chilling the ammonia-containing reaction effluent to condense and coalesce ammonia which can be removed as a liquid product. After removal of the ammonia the gas in the synthesis loop still may contain ammonia, e.g., up to about 5 volume percent ammonia. The coalescing of ammonia from the gas in the ammonia synthesis loop is preferably conducted subsequent to the recycle compression. Two or more ammonia coalescers may be employed in the synthesis loop to enhance ammonia recovery.

The compressed synthesis feed gas may be introduced into the ammonia synthesis loop at any suitable location, e.g., before or after the recycle compression, and before or after the ammonia removal. In many instances, however, it is preferred to introduce the compressed synthesis feed into the ammonia synthesis loop prior to coalescing ammonia since the coalescing can remove water vapor and thus ensure that the reactor feed gas has a low oxygen-containing compound content to prevent catalyst poisoning.

The purge stream is removed from the ammonia synthesis loop in order to maintain desirably low concentrations of inert contaminants in the reactor feed gas. The purge stream often comprises up to about 3, say, about 0.5 to 2.5, most frequently about 0.5 to 2, volume percent of the gas in the synthesis loop at the point from which the purge is taken. In view of the recovery of hydrogen from the purge stream in accordance with the processes of this invention, purge rates higher than those conventionally employed in ammonia synthesis processes may be attractive. The volume of the purge stream is usually sufficient to maintain the concentrations of methane and argon in the reactor feed gas substantially constant.

It is generally preferred to remove the purge stream from the gases in the ammonia synthesis loop upstream of the introduction of the compressed synthesis feed gas to prevent purging the fresh hydrogen and nitrogen feed. The purge stream may be removed from the synthesis loop upstream of the ammonia removal, or the purge stream may be removed from the synthesis loop downstream of the ammonia removal from the synthesis loop. Usually the gas in the ammonia synthesis loop downstream from the ammonia removal contains reduced, but still significant, amounts of ammonia.

In the case in which the purge stream is removed from the synthesis loop upstream of the ammonia removal, the ammonia concentration in the purge stream is often at least about 5 volume percent, up to about 30, e.g., about 8 to 20, say, about 10 to 15 or 20, volume percent. Conveniently, the purge stream is chilled to condense and coalesce ammonia, and the separated liquid ammonia can provide additional ammonia product. The purge stream still contains significant amounts of ammonia, e.g., often at least about 1 to 2 volume percent ammonia. This procedure is particularly desirable when modifying existing ammonia synthesis plants to produce ammonia in accordance with this invention since existing ammonia synthesis plants generally utilize an ammonia coalescer to remove ammonia from the purge stream. The amount of ammonia in the purge stream is further reduced by diffusion of the ammonia through the separation membrane. Thus, the ammonia concentration of the non-permeating gas may be sufficiently low that it is directly suitable for use as, e.g., fuel, or can be vented to the environment, especially after recovering energy provided by the higher pressure of the purge stream. On the other hand, the purge stream may contact the separation membrane without previous removal of ammonia. Since the non-permeating gas will have reduced weight amounts of both hydrogen and ammonia due to their permeating the membrane, the size and operating costs of apparatus to remove ammonia from the purge stream may be substantially reduced.

In the case in which the purge stream is removed from the synthesis loop downstream of the ammonia removal, the ammonia concentration in the purge stream is often at least about, say, at least about 0.5 up to about 5, volume percent. In view of the low ammonia concentration in the purge stream, removal of ammonia from the purge stream prior to contacting the separation membrane is usually not done. Additional ammonia is recovered from the purge stream by permeation through the separation membrane, and the non-permeating gas may be suitable for use as, e.g., fuel or can be vented to the atmosphere, especially after recovering energy provided by the high pressure of the purge stream.

The purge stream may, if necessary, be subjected to heat exchange to provide suitable temperatures for effecting hydrogen separation by the use of separation membranes. Often, the purge stream to be contacted with the separation membrane is at least about 10° C., say, about 15° to 50° C., preferably, about 25° to 40° C. Higher temperatures may be employed depending upon the physical stability and the selectivity of separation of the membrane at the higher temperatures.

The purge stream is contacted with a separation membrane which exhibits selectivity to the permeation of each of hydrogen and ammonia as compared to the permeation of each of methane and argon. In view of the generally substantially lower volume concentrations of methane and argon in the purge stream as compared to the volume concentration of hydrogen in the purge stream, suitable separation membranes need not exhibit high selectivity of separation of hydrogen from each of methane and argon in order to provide an enhanced ammonia synthesis process. Generally, the selectivity of separation of a membrane is described in terms of the ratio of the permeability of the fast permeating gas (hydrogen) to the permeability of the slow permeating gas (methane or argon) wherein the permeability of the gas through the membrane can be defined as the volume of gas, standard temperature and pressure (STP), which passes through a membrane per square centimeter of surface area, per second, for a partial pressure differential of 1 centimeter of mercury across the thickness of the membrane. This ratio is referred to as a separation factor for the membrane. For sake of uniformity, the permeabilities and separation factors mentioned herein are determined at about 25° C. and a pressure differential of about 3.4 atmospheres across the membrane with the feed side of the membrane being at about 3.4 atmospheres absolute unless otherwise indicated. Often, the separation factor of the membrane for the permeation of hydrogen over methane is at least about 10. Separation factors for hydrogen over methane of 100 or greater may be provided by certain membranes. However, in many instances, little advantage may be obtained using such highly selective membranes. Often the membrane may be selected on its ability to quickly permeate hydrogen rather than on its selectivity of separation. Consequently, membranes exhibiting a separation factor for hydrogen over methane of about 10 to 80 are acceptable. Clearly, the higher the permeability of hydrogen through a membrane, the less effective membrane surface area which is required for a desired hydrogen flux through the membrane. Particularly desirable membranes exhibit hydrogen permeabilities of at least about $1 \times 10^{-6}$, preferably at least about $20 \times 10^{-6}$, cubic centimeters of hydrogen per square centimeter of membrane surface area per second at a partial pressure drop of 1 centimeter of mercury across the membrane. Often the permeability of ammonia through the separation membrane is at least about 0.25, preferably at least about 0.5, say, about 0.5 to 50 or more, times the hydrogen permeability.

The effective membrane surface area (i.e., the membrane area available to effect separation) should be sufficient to provide a desired hydrogen flux. The amount of effective membrane surface area to be employed is influenced by, for instance, the permeability of hydrogen through the membrane under the separation conditions, i.e., temperature, absolute pressure, total pressure differential across the membrane, and partial pressure differential of hydrogen across the membrane. According to current theory, the rate at which a moiety permeates through a separation membrane is dependent in part on the driving force for that moiety. With respect to membrane separations in which the moiety is gaseous and passes from a feed gas mixture to a permeating gas on the exit side of the membrane, the driving force is the differential in fugacity for that moiety. Generally, fugacities for ideal gases are approximated by partial pressures and thus conventionally in gas separations, the driving force is referred to in terms of partial pressure differentials. The partial pressure of a moiety in a gas mixture can be defined as the concentration of the moiety in the gas mixture on a molecular basis times the total pressure of the gas mixture. Often, the concentration of the moiety on a molecular basis is approximated by the volume concentration of the moiety. In view of the effect of the concentration of the moiety in the gas and the total pressure of the gas on the partial pressure, these parameters can be varied jointly or separately to provide suitable partial pressure differentials across the membrane to provide desirable rates of permeation of the moiety. Advantageous total pressure differentials across the membrane are at least about 20 or 50 atmospheres. However, the total pressure differential should not be so great as to unduly stress the membranes such that it ruptures or is prone to easily rupturing. In many instances, the pressure differential across the membrane is about 50 to 120, say, about 50 to 90 or 100 atmospheres. Desirably, sufficient effective membrane area and total pressure differential is provided that at least about 20 percent, say, about 40 to 90, preferably about 40 to 80, percent of the hydrogen in the purge stream permeates through the separation membrane. The amount of ammonia permeating the separation membrane is advantageously at least about 20, say, about 30 to 90, preferably about 40 to 90, percent of the ammonia in the purge stream contacting the separation membrane.

The volume ratio of the permeating to non-permeating gases from the separation membrane as well as the composition of each of the permeating and non-permeating gases which may be employed in accordance with the method of this invention can be varied over a wide range. By way of illustration, Table I provides typical approximate concentrations of the significant components in the gases to be contacted with a membrane and those in the permeating and non-permeating gases for (1) the aspect of the invention in which ammonia is recovered from the gas in the synthesis loop upstream of the purge stream or is recovered from the purge stream by chilling to condense and coalesce ammonia prior to contacting the separation membrane (ammonia recovered) and (2) the aspect of the invention in which the concentration of ammonia in the purge stream contacting the separation membrane is substantially the same as the concentration of ammonia in the reaction effluent from the ammonia synthesis reaction zone (ammonia not recovered).

A permeator containing the separation membrane may be of any suitable design for gas separations, e.g., plate and frame, or having spiral wound film membranes, tubular membranes, hollow fiber membranes, or the like. Preferably, the permeator comprises hollow fiber membranes due to the high membrane surface area per unit volume of permeator which can be obtained. When the membranes are in tubular or hollow fiber form, a plurality of the membranes can be substantially parallelly arranged in bundle form and the purge stream can be contacted with either the outside (shell side) or the inside (bore side) of the membranes. Preferably, the purge stream is contacted with the shell side of the membranes since passage of the purge stream through the bore side of the membranes may involve substantially greater pressure losses. With shell side feed, the shell side effluent from the permeator can often be at a pressure within less than about 1 or 5, often within less than about 0.5, atmospheres below the pressure of the purge stream fed to the permeator. Since the amount of each of hydrogen and ammonia on the feed side of the membrane is continually diminishing as the hydrogen and ammonia permeate to the exit side of the membrane which has increasing amount of each of hydrogen and ammonia, the hydrogen and ammonia partial pressure differentials across the membrane can be continually changing. Therefore, flow patterns in the permeator can be utilized to provide desirable recoveries of hydrogen and ammonia from the purge stream. For instance, the flows of the purge stream and the permeating gas can be concurrent or countercurrent. With bundles of hollow fiber and tubular membranes, the shell side feed can be radial, i.e., the feed stream transversely flows past the membrane either to the inside or, usually, the outside of the bundle, or the flow can be axial, i.e., the feed stream disperses within the bundle and generally flows in the direction in which the hollow fibers or tubular membranes are oriented.

TABLE I

| | Volume Percent of Stream | | | | | |
|---|---|---|---|---|---|---|
| | To Membrane | | Permeating Gas | | Non-Permeating Gas | |
| Component | General | Preferred | General | Preferred | General | Preferred |
| *Ammonia Recovered:* | | | | | | |
| Hydrogen | 50–70 | 57–69 | 60–99+ | 80–98 | 20–60 | 20–50 |
| Nitrogen | 13–24 | 19–23 | Trace-15 | Trace-13 | 20–50 | 30–50 |
| Ammonia | 0.5–5 | 1–4 | 0.5–15 | 1–10 | 0.1–10 | 0.1–5 |
| Argon | 2–6 | 3–5 | Trace-5 | Trace-2 | 2–12 | 4–12 |
| Methane | 4–20 | 6–15 | Trace-5 | Trace-2 | 5–30 | 12–30 |
| Helium | 0–15 | 0–5 | 0–10 | 0–3 | 0–5 | 0–2 |
| *Ammonia Not Recovered:* | | | | | | |
| Hydrogen | 40–66 | 45–60 | 60–96 | 65–90 | 20–50 | 20–45 |
| Nitrogen | 13–22 | 15–20 | Trace-15 | Trace-13 | 20–50 | 20–50 |
| Ammonia | 5–30 | 8–20 | 4–40 | 10–35 | 1–20 | 1–10 |
| Argon | 2–6 | 3–5 | Trace-5 | Trace-2 | 2–12 | 4–12 |
| Methane | 4–20 | 6–15 | Trace-5 | Trace-2 | 5–30 | 12–30 |
| Helium | 0–15 | 0–5 | 0–10 | 0–3 | 0–5 | 0–2 |

Any suitable material may be employed for the separation membrane. Typical membrane materials include organic polymers or organic polymer mixed with inorganics, e.g., fillers, reinforcements, and the like. Polymers which may be suitable for the separation membranes can be substituted or unsubstituted polymers, especially carbon based polymers having carbon-carbon or carbon-oxygen backbones, and may be selected from polysulfones; poly (styrenes), including styrene-containing copolymers such as acrylonitrile-styrene copolymers, styrene-butadiene copolymers and styrenevinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramidediisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Since the flux through a membrane is affected by the thickness of the membrane material through which a permeating moiety must pass, the membrane material is preferably as thin as possible yet sufficiently thick to provide adequate strength to the membrane to withstand the separation conditions. The membrane may be isotropic, i.e., has substantially the same density throughout, or may be anisotropic, i.e., has at least one zone of greater density than at least one other zone of the membrane. The membrane may be chemically homogeneous, i.e., constructed of the same material, or may be a composite membrane. Suitable composite membranes may comprise a thin layer which effects the separation on a porous physical support which provides the necessary strength to the membrane to withstand membrane separation conditions. Other suitable composite membranes are the multicomponent membranes disclosed by Henis, et al, in U.S. Pat. application Ser. No. 832,481, filed Sept. 13, 1977, herein incorporated by reference. These membranes comprise a porous separation membrane which substantially effects the separation and a coating material in occluding contact with the porous separation membrane. These multicomponent membranes are particularly attractive for gas separations in that good selectivity of separation and high flux through the membrane can be obtained.

The materials for the coating of the multicomponent membranes such as disclosed by Henis, et al, may be natural or synthetic substances, and are often polymers, and advantageously exhibit the appropriate properties to provide occluding contact with the porous separation membrane. Synthetic substances include both addition and condensation polymers. Typical of the useful materials, which can comprise the coating, are polymers which can be substituted or unsubstituted, and which are solid or liquid under gas separation conditions, and include synthetic rubbers; natural rubbers; relatively high molecular weight and/or high boiling liquids; organic prepolymers; poly(siloxanes) (silicone polymers); polysilazanes; polyurethanes; poly(epichlorhydrin); polyamines; polyimines; polyamides; acrylonitrile-containing copolymers such as poly(α-chloroacrylonitrile) copolymers; polyesters (including polylactams and polyarylates), e.g., poly(alkyl acrylates) and poly(alkyl methacrylates) wherein the alkyl groups have, say, 1 to about 8 carbons, polysebacates, polysuccinates, and alkyd resins; terpinoid resins; linseed oil; cellulosic polymers; polysulfones, especially aliphatic-containing polysulfones; poly(alkylene glycols) such as poly(ethylene glycol), poly(propylene glycol), etc.; poly(alkylene) polysulfates; polypyrrolidones; polymers from monomers having α-olefinic unsaturation such as poly(olefins), e.g., poly(ethylene), poly(propylene), poly(butadiene), poly(2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly(methylvinylketone)), poly(vinyl esters) (e.g., poly(vinyl benzoate)), poly(vinyl halides) (e.g., poly(vinyl bromide)), poly(vinylidene halides), poly(vinylidene carbonate), poly(N-vinylmaleimide), etc., poly(1,5-cyclooctadiene), poly(methylisopropenylketone), fluorinated ethylene copolymer; poly(arylene oxides), e.g., poly(xylylene oxide) and brominated poly(xylylene oxide); polycarbonates; polyphosphates, e.g., poly(ethylenemethylphosphate); and the like, and any interpolymers including block interpolymers containing repeating units from the above, and grafts and blends containing any of the foregoing. The polymers may or may not be polymerized after application to the porous separation membrane.

The non-permeating gas may be utilized in any suitable manner, e.g., used as fuel. Since the nonpermeating gas can be at high pressure, energy can be recovered from this gas.

The permeating gas contains valuable hydrogen and ammonia and is recycled such that the hydrogen can be utilized in the ammonia synthesis and the ammonia can be recovered as product ammonia. Advantageously, the permeating gas is directly introduced into the ammonia synthesis loop. Since any constituents of the permeating gas must be obtained from the gas in the ammonia synthesis loop, the permeating gas is fully compatible with the materials of construction of the ammonia synthesis loop and recycle compressor, condensors, heat exchangers and the like which may be in communication with the ammonia synthesis loop. Moreover when retrofitting separation membrane hydrogen recovery systems in existing ammonia plants in this manner in order to utilize a process of this invention, no demands are placed on the synthesis feed gas compressor to compress the permeating gas such that it can be introduced directly into the synthesis loop. The capacity of the synthesis feed gas compressor may be employed to supply additional synthesis feed gas to the ammonia synthesis loop to increase ammonia production.

In accordance with a preferred aspect of the processes of this invention, the pressure under which the permeating gas exists the permeator is taken advantage of by minimizing the amount of recompression necessary for introduction of the permeating gas into the ammonia synthesis loop. Thus recompression costs are minimized. The permeating gas may be provided at a suitable pressure for introduction into the ammonia synthesis loop by at least one of compressing the permeating gas to a suitable pressure or compressing the purge stream prior to contacting the separation membrane such that the permeating gas is at a suitable pressure. In general, the total pressure differential across the separation membrane for a given ammonia synthesis system in accordance with this invention is selected to provide the largest operating total pressure differential across the separation membrane (within the range of suitable operating pressure differentials for a given separation membrane) which provides a permeating gas at a suitable pressure for recycling to the ammonia synthesis reaction zone. Usually, the permeating gas is at a slightly higher pressure than the gas stream into which it is introduced, e.g., about 0.1 to 5 atmospheres higher.

The invention will be further described with reference to the drawings in which:

In FIGS. 1 to 3, like reference numerals indicate like features.

Figure 1:
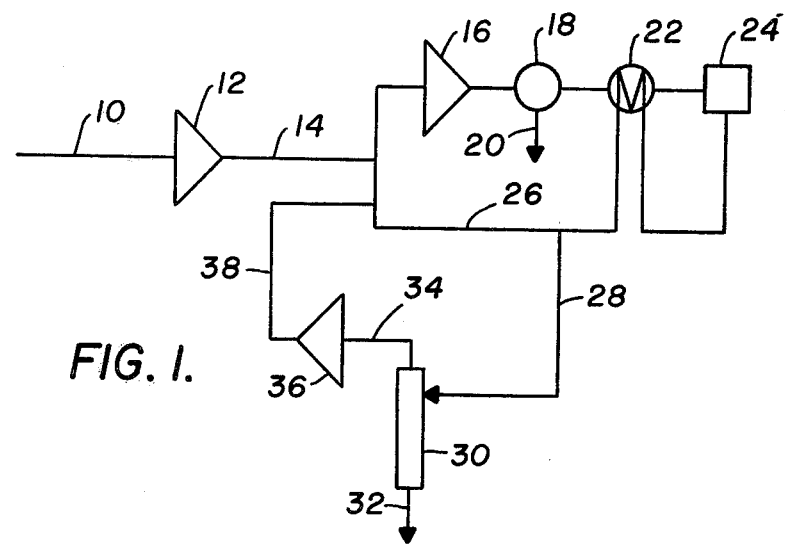
FIG. 1 is a simplified schematic flow diagram of an ammonia synthesis plant in accordance with this invention in which plant the permeating gas from the permeator is compressed to the pressure of the gas in the synthesis loop and introduced into the synthesis loop upstream of the removal of ammonia from the gas in the synthesis loop.

With reference to FIG. 1, a synthesis feed gas comprising hydrogen and nitrogen in approximately a 3:1 mole ratio is introduced via line 10 into the ammonia synthesis system. The synthesis feed gas is compressed in several stages to the superatmospheric ammonia synthesis pressure in compressor 12.

The effluent from compressor 12 is transported via conduit 14 to the ammonia synthesis loop. The conventional synthesis loop is depicted in that the synthesis feed gas passes through recycle compressor 16 and ammonia coalescer 18 from which product ammonia is withdrawn via line 20. Positioning coalescer 18 prior to the ammonia synthesis reaction zone 24 insures that any water vapor which may be present in the reaction gas is reduced to provide less than about 10 ppmv total oxygen-containing compounds in the reactor feed gas. The reactor feed gas is heated by indirect heat exchange with the reaction effluent in heat exchanger 22. The reaction effluent from heat exchanger 22 is cooled to temperature of about 0° to 100° C., and is recycled via line 26 (ammonia synthesis loop) to the recycle compressor 16.

A purge stream is withdrawn from line 26 via line 28. The volume of the purge stream is sufficient to maintain an acceptable level of inert contaminants in the ammonia synthesis loop and ammonia synthesis reaction zone. As depicted, the purge stream is removed prior to the condensation of the ammonia product from the gas in the ammonia synthesis loop. Thus, the purge stream contains substantial quantities of ammonia. The purge stream is passed to permeator 30.

Figure 4:
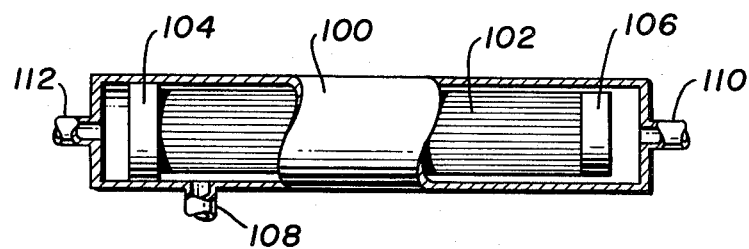
FIG. 4 is a schematic cross-section of a hollow fiber membrane-containing permeator which may be employed in an ammonia synthesis plant in accordance with this invention.

A schematic cross-section of an axially, shell-side fed permeator such as may be employed in the system of FIG. 1 is provided in FIG. 4. With reference to FIG. 4, within casing 100 is positioned a plurality of hollow fiber membranes which are arranged in bundle generally designated by the numeral 102. One end of the bundle is embedded in header 104 such that the bores of the hollow fibers are in communication through the header. The header is positioned in casing 100 such that essentially the only fluid communication through the header is through the bores of the hollow fibers. The opposite ends of the hollow fibers are sealed in end seal 106. The purge stream enters the casing through feed port 108, disperses within bundle 102 and passes to shell exit port 110 positioned at the opposite end of the casing. Hydrogen and ammonia permeate to the bores of the hollow fibers, and pass via the bores through header 104. The permeating gas exits casing 100 through permeate port 112. While FIG. 4 depicts a hollow fiber membrane-containing permeator in which only one end of the hollow fibers is open, it is apparent that both ends of the hollow fibers can be open.

With reference to FIG. 1, the non-permeating gases contain hydrogen, methane, nitrogen, argon and, possibly, helium and exit permeator 30 via line 32. The permeating gas, i.e., a hydrogen-rich stream, exits permeator 30 via line 34. The permeating gas in line 34 is compressed in compressor 36 to a pressure slightly higher than the pressure in the synthesis loop, and the permeating gas is fed via line 38 to the ammonia synthesis loop.

Figure 2:
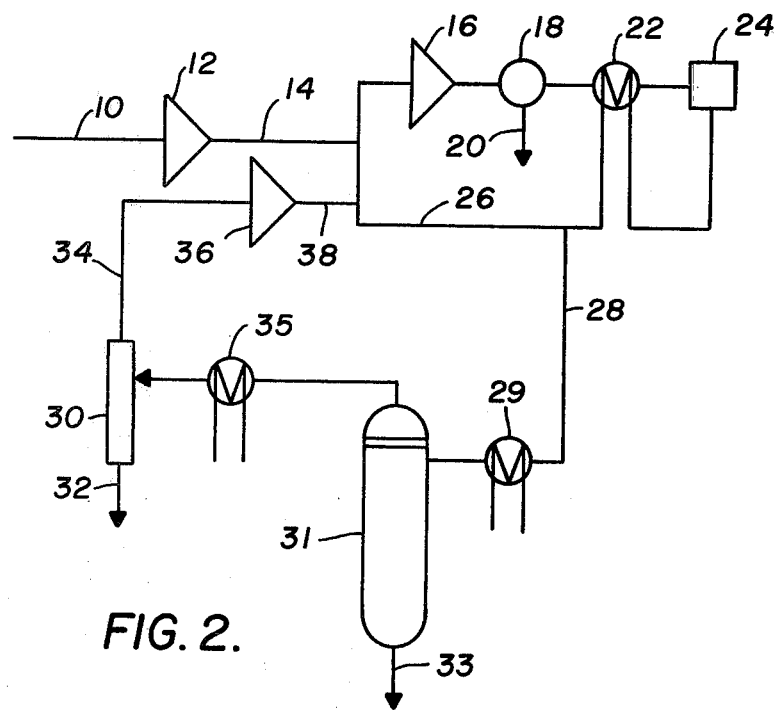
FIG. 2 is a simplified schematic flow diagram of an ammonia synthesis plant in accordance with this invention which plant is similar to the plant of FIG. 1 except that the purge stream is compressed and ammonia removed by chilling prior to the purge stream contacting the separation membrane.

The ammonia synthesis system of FIG. 2 is substantially the same as the system depicted in FIG. 1 except that the purge stream in line 28 is passed to cooler 29. Conveniently, cooler 29 employs the plant ammonia refrigerant which may be at a temperature of about $-28°$ to $-38°$ C. At these temperatures, a substantial portion of the ammonia contained in the purge stream is condensed. The cooled purge stream, e.g., at a temperature of about $-15°$ to $-38°$ C., is passed to purge separator 31 where the liquid ammonia is drawn off via line 33. The overhead from purge separator 31 usually contains greater than about 0.5, for instance, about 1 or 2 to 4, volume percent ammonia. Since the purge stream is chilled, it is passed to indirect heat exchanger 35 to increase the temperature of the purge stream to, say, about 25° to 40° C. prior to entering permeator 30.

Figure 3:
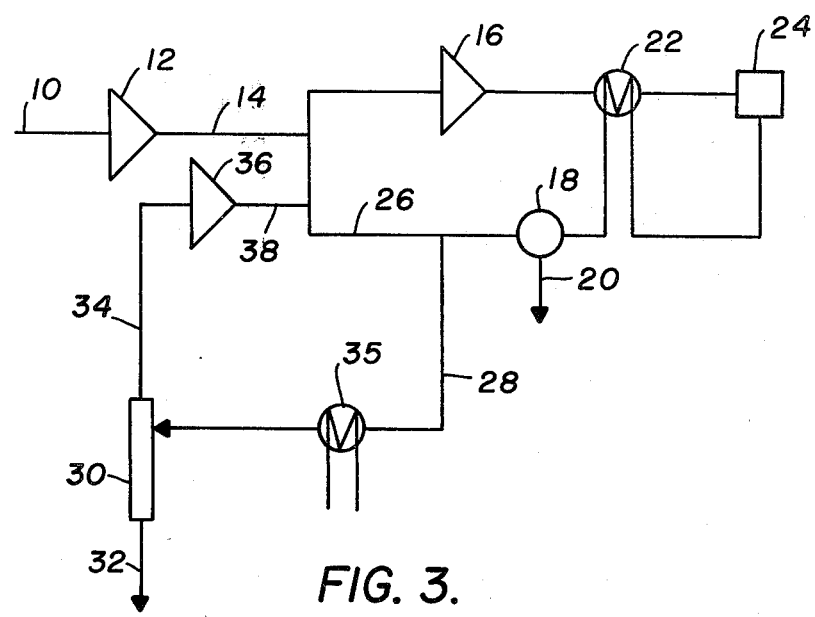
FIG. 3 is a simplified schematic flow diagram of an ammonia synthesis plant in accordance with this invention which plant is similar to the plant of FIG. 1 except that the purge stream is removed from the ammonia synthesis loop downstream of the ammonia removal and the permeating gas from the permeator is at a pressure suitable for direct introduction into the ammonia synthesis loop.

The ammonia synthesis system of FIG. 3 is directed to an aspect of this invention in which the purge stream is withdrawn from the ammonia synthesis loop downstream of the ammonia removal and upstream of the introduction of the fresh synthesis feed gas into the synthesis loop. With respect to FIG. 3, the ammonia synthesis system is similar to that depicted in FIG. 1 except as follows. Ammonia coalescer 18 is downstream of ammonia synthesis reaction zone 24 and heat exchanger 22. Several advantages follow from this system. For instance, since the fresh synthesis feed gas has not been combined with the reaction effluent, a lesser weight of gas needs to be refrigerated to condense the ammonia. Since ammonia is removed from the synthesis loop prior to recompression in recycle compressor 16, less energy is expended in recirculating the gas in the synthesis loop.

Since the purge stream is at a low temperature because of the cooling to condense the ammonia product, the purge stream is heated in heat exchanger 35 to suitable temperatures for effecting the separation of hydrogen and ammonia, e.g., about 25° to 40° C. The warmed purge stream is passed to permeator 30. Because the amount of ammonia permeating the permeator is a small portion of the reactor feed gas passing to the ammonia synthesis reaction zone, e.g., less than about 0.25 volume percent, and often less than 0.05 volume percent, of the reactor feed gas, the equilibrium in the ammonia synthesis reaction may not be significantly adversely affected when the system of FIG. 3 is employed.

The following example is provided in illustration of a process in accordance with this invention. All parts and percentages are by volume unless otherwise noted.

Ammonia is synthesized from nitrogen and hydrogen employing an ammonia synthesis plant similar to that depicted in FIG. 2. The hydrogen feedstock is obtained by primary reforming of natural gas and the synthesis feed gas is obtained by introducing air and the primary reformer effluent into a secondary reformer. The effluent from the secondary reformer is treated in a shift convertor, a carbon dioxide absorber and a methanator to provide approximately 65,000 kilograms per hour of a synthesis feed gas containing about 25.5 mole percent nitrogen, 73.3 mole percent hydrogen, 0.6 mole percent methane, 0.4 mole percent argon, and 0.2 mole percent water. The synthesis feed gas is obtained at about 28 atmospheres absolute and 50° C. The feed gas is compressed to about 70 atmospheres absolute, cooled to about 8° C. to condense water. The dried feed gas is further compressed to about 133 atmospheres absolute and is introduced into and combined with the gas in the ammonia synthesis loop. In the ammonia synthesis loop the combined gases are compressed an additional 6 or 7 atmospheres and are treated in an ammonia coalescer which removes about 44,500 kilograms of ammonia per hour. The gases are heated to about 105° to 110° C. Approximately 317,000 kilograms per hour of gas comprising about 63.5 mile percent hydrogen, 21 mole percent nitrogen, 10.2 mole percent methane, 3.4 mole percent argon, and 2 mole percent ammonia are introduced into a Kellogg-type ammonia synthesis convertor utilizing a promoted iron ammonia synthesis catalyst. A reaction effluent gas at a temperature at about 280° C. is obtained from the synthesis convertor and contains about 12 percent ammonia. Th e effluent is cooled to about 43° C. A purge stream of about 1.7 percent of the gases in the synthesis loop is removed, and the remaining gases are returned to the synthesis loop compressor.

The purge stream is treated to remove ammonia as depicted in the system of FIG. 2. The purge stream is chilled to about $-23°$ C. and about 820 kilograms per hour of liquid ammonia are condensed and removed from the purge stream. The purge stream contains about 2 volume percent ammonia and is at a pressure of about 136 atmospheres absolute.

The purge stream is heated to about 30° C. and then passed to 35 hollow fiber membrane-containing permeators. The permeators are similar to that depicted in FIG. 4 and each permeator contains about 93 square meters of effective surface area. The membranes are comprised of anisotropic polysulfone substantially prepared in accordance with the method disclosed in Example 64 of the Henis, et al, U.S. patent application except that the spinning solution contains about 30 weight percent solids; the spinning jet dimensions are about 458 microns outside diameter, 127 microns inside diameter, and 76 microns diameter injection bore; the injection fluid is a mixture of 60 volume percent dimethylacetamide in water. The last godet bath is at a temperature of about 50° C.; and the fibers are washed for 24 hours with no subsequent storage in water. Appropriate polymer solution and injection fluid rates are employed such that the dimensions of the hollow fibers are about 450 microns outside diameter and about 120 microns inside diameter. The permeator exhibits separation factor of hydrogen over methane of about 30 and a permeability of about $50 \times 10^{-6}$ cubic centimeters (STP) of hydrogen per square centimeter of surface area per second per centimeter of mercury partial pressure drop. The ammonia permeability is slightly higher than the hydrogen permeability. A pressure drop of about 65 atmospheres is maintained across the membrane, and approximately 2700 kilograms per hour of permeating gas is obtained from the bore side of the permeator. The permeating gas comprises about 87 volume percent hydrogen, 7 volume percent nitrogen, 2.7 volume percent methane, 1.2 volume percent argon, and about 2 to 3 volume percent ammonia. The non-permeating gas from the permeators is at a pressure of about 136 atmospheres absolute and contains about 41 volume percent hydrogen, 38 volume percent nitrogen, 14 volume percent methane, 7 volume percent argon, and less than 1 volume percent ammonia. The permeating gas is compressed and fed to the ammonia synthesis loop.

It is claimed:

1. A process for synthesizing ammonia from hydrogen and nitrogen comprising:
   a. introducing to and reacting in an ammonia synthesis reaction zone a nitrogen and hydrogen containing reactor feed gas at a superatmospheric synthesis pressure to produce ammonia said reactor feed gas comprising inert contaminants;
   b. withdrawing an ammonia-containing reaction effluent from said ammonia synthesis reaction zone and recycling said reaction effluent to said ammonia synthesis reaction zone in an ammonia synthesis loop;
   c. introducing a synthesis feed gas into said ammonia synthesis loop, said synthesis feed gas being at substantially said superatmospheric synthesis pressure and comprising nitrogen, hydrogen, and at least one of methane and argon;
   d. removing ammonia from the reaction effluent in said ammonia synthesis loop;
   e. removing a purge stream containing ammonia from said ammonia synthesis loop in an amount sufficient to maintain the concentration of inert contaminants in the reactor feed gas less than about 25 volume percent and being at substantially said superatmospheric synthesis pressure;
   f. contacting said purge stream containing at least about 0.5% volume percent ammonia with a separation membrane, said purge stream when contacted with the separation membrane being at a superatmospheric pressure, said separation membrane having a feed side and a permeate exit side at a lower total pressure and exhibiting selective permeation of each of hydrogen and ammonia as compared to the permeation of each of methane and argon;
   g. permeating through and recovering from the permeate exit side of said separation membrane a permeating gas comprising at least about 20 percent of the hydrogen and at least about 20 percent of the ammonia in the purge stream containing the separation membrane;
   h. removing from the feed side of said separation membrane a non-permeating gas containing a lesser amount by weight of ammonia than the amount of ammonia in the purge stream contacting the separation membrane; and
   i. recycling said permeating gas to said ammonia synthesis reaction zone.

2. The process of claim 1 wherein the permeating gas is compressed to substantially said superatmospheric synthesis pressure and introduced into said ammonia synthesis loop.

3. The process of claim 1 wherein the purge stream is sufficiently compressed prior to contacting the separation membrane that the permeating gas is at a sufficient pressure for introduction into the ammonia synthesis loop and is introduced into the ammonia synthesis loop.

4. The process of claim 1, 2 or 3 wherein the pressure drop across the separation membrane is at least about 20 atmospheres.

5. The process of claim 1, 2 or 3 wherein the purge stream is removed from said ammonia synthesis loop upstream of the removal of ammonia from the ammonia-containing gas.

6. A process for synthesizing ammonia from hydrogen and nitrogen comprising;
   a. introducing to and reacting in an ammonia synthesis reaction zone containing an ammonia synthesis catalyst a nitrogen and hydrogen-containing reactor feed gas at a superatmospheric synthesis pressure of about 100 to 350 atmospheres absolute to produce ammonia, said reactor feed gas having a mole ratio of hydrogen to nitrogen of about 2.9:1 to 3.3:1 and comprising inert contaminants;
   b. withdrawing an ammonia-containing reaction effluent from said ammonia synthesis reaction zone and recycling said reaction effluent to said ammonia synthesis reaction zone in an ammonia synthesis loop, said reaction effluent comprising hydrogen, nitrogen, ammonia and at least one of methane and argon wherein the reaction effluent comprises about 10 to 25 volume percent ammonia;
   c. removing a purge stream from said ammonia synthesis loop in an amount sufficient to maintain the concentration of inert contaminants in the reactor feed gas less than about 25 volume percent;
   d. cooling said purge stream at a pressure of at least substantially said superatmospheric synthesis pressure to coalesce ammonia and separating the coalesced ammonia from the purge stream to provide a purge stream containing about 1 to 4 volume percent ammonia;
   e. contacting the purge stream containing about 1 to 4 volume percent ammonia at a pressure of at least substantially said superatmospheric pressure with a separation membrane, said separation membrane having a feed side and a permeate exit side and exhibiting selective permeation of each of hydrogen and ammonia as compared to the permeation of each of methane and argon;
   f. providing said permeate exit side of said separation membrane at a lower total pressure said lower pressure being at least about 20 atmospheres less than the pressure at said feed side of the membrane;
   g. permeating through and recovering from the permeate exit side of said separation membrane a permeating gas comprising at least about 20 percent of the hydrogen and at least about 20 percent of the ammonia in the purge stream;
   h. removing from the feed side of said separation membrane a non-permeating gas;
   i. recycling said permeating gas to said ammonia reaction zone;

j. introducing a synthesis feed gas into said ammonia synthesis loop after said purge stream has been withdrawn from the ammonia synthesis loop, said synthesis feed gas being at substantially said superatmospheric synthesis pressure and comprising nitrogen, hydrogen, and at least one of methane and argon, wherein the mole ratio of hydrogen to nitrogen is less than the mole ratio of hydrogen to nitrogen in the reactor feed gas and is about 2.7:1 to 3.2:1; and k. removing ammonia from the reaction effluent in the ammonia synthesis loop after introducing the synthesis feed gas into the ammonia synthesis loop.

7. The process of claim 6 wherein the separation membrane exhibits a separation factor for hydrogen over methane of at least about 10.

8. The process of claim 7 wherein the permeating gas comprises about 60 to 99 volume percent hydrogen.

9. The process of claim 7 wherein the permeating gas comprises about 40 to 90 percent of the hydrogen in the purge stream.

10. The process of claim 6 wherein the reaction gas introduced into the ammonia synthesis reaction zone comprises about 0.5 to 5 volume percent ammonia, about 2 to 15 volume percent methane, and about 2 to 10 volume percent argon.

11. The process of claim 6 wherein the permeating gas is compressed to substantially said superatmospheric synthesis pressure and introduced into said ammonia synthesis loop.

12. The process of claim 6 wherein the purge stream is sufficiently compressed prior to contacting the separation membrane that the permeating gas is at a sufficient pressure for introduction into the ammonia synthesis loop and is introduced into the ammonia synthesis loop.

* * * * *